United States Patent
Komatsu

(10) Patent No.: US 8,818,128 B2
(45) Date of Patent: Aug. 26, 2014

(54) IMAGE PROCESSING APPARATUS, IMAGE PROCESSING METHOD, AND PROGRAM

(75) Inventor: Satoru Komatsu, Yokohama (JP)

(73) Assignee: Canon Kabushiki Kaisha (JP)

( * ) Notice: Subject to any disclaimer, the term of this patent is extended or adjusted under 35 U.S.C. 154(b) by 187 days.

(21) Appl. No.: 13/592,581

(22) Filed: Aug. 23, 2012

(65) Prior Publication Data

US 2013/0050545 A1    Feb. 28, 2013

(30) Foreign Application Priority Data

Aug. 26, 2011   (JP) .................................. 2011-185066

(51) Int. Cl.
   *G06K 9/40*   (2006.01)

(52) U.S. Cl.
   USPC ............ 382/275; 382/167; 382/242; 348/242

(58) Field of Classification Search
   USPC ............................ 382/167, 242, 275; 348/242
   See application file for complete search history.

(56) References Cited

U.S. PATENT DOCUMENTS

| 2006/0239549 A1* | 10/2006 | Kelly et al. ................... 382/167 |
| 2009/0129696 A1* | 5/2009 | Komatsu et al. .............. 382/264 |
| 2010/0303350 A1* | 12/2010 | Demandolx .................. 382/167 |
| 2012/0177289 A1* | 7/2012 | Stec et al. ..................... 382/167 |

FOREIGN PATENT DOCUMENTS

| JP | 2008-147980 A | 6/2008 |
| JP | 2008-147981 A | 6/2008 |

\* cited by examiner

*Primary Examiner* — Chan Park
*Assistant Examiner* — Eueng-Nan Yeh
(74) *Attorney, Agent, or Firm* — Rossi, Kimms & McDowell LLP

(57) ABSTRACT

An apparatus reduces color fringing in a color image, so that a post-processed color image is positioned in a restricted area in a chromaticity diagram. Where a first line passes a first point corresponding to a target pixel of the pre-processed color image and an origin, the restricted area is located on a side of the origin with respect to a line that is perpendicular to the first line and passes the first point, and held between two parallel lines separated from the first line by an equal distance that is equal to or smaller than half a distance between the origin and the first point. The restricted area is held by two lines each of which passes the origin and represents a boundary between one of the two color components and an area representing a color component made by mixing the one color component and another color component.

13 Claims, 9 Drawing Sheets

| | | | | | |
|---|---|---|---|---|---|
| 0 | 0 | 0 | 1 | 2 | 3 |
| 0 | 0 | 1 | $\sqrt{2}$ | $\sqrt{5}$ | $\sqrt{10}$ |
| 0 | 0 | 1 | 2 | $\sqrt{8}$ | $\sqrt{13}$ |
| 0 | 1 | $\sqrt{2}$ | $\sqrt{5}$ | $\sqrt{10}$ | $\sqrt{17}$ |
| 1 | $\sqrt{2}$ | $\sqrt{5}$ | $\sqrt{8}$ | $\sqrt{13}$ | $\sqrt{20}$ |
| 2 | $\sqrt{5}$ | $\sqrt{8}$ | $\sqrt{13}$ | $\sqrt{18}$ | 5 | ific
IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program used to reduce color fringing in a color image.

2. Description of the Related Art

A color image pickup system causes a color that cannot exist by nature or color fringing around a bright region in an image due to the chromatic aberration of its imaging optical system. The color fringing is likely to occur at part distant from the center wavelength of the imaging optical system. In the visible-light color image pickup system, a blue artifact, a red artifact, or a purple artifact as a mixture of them occurs like a blur, and is referred to as color fringing or purple fringe. Recently, an image processing method configured to reduce the artifact is proposed.

For example, Japanese Patent Laid-Open Nos. ("JPs") 2008-147980 and 2008-147981 propose an image processing method for calculating a color fringing region and a color fringing intensity through a spatial operation for each color component of the color fringing and for reducing the color fringing by subtracting a color-fringing estimated amount for each color component from an input color image.

Nevertheless, the image processing methods described in JPs 2008-147980 and 2008-147981 cause an image having an unnatural hue when the number of color fringing components becomes two or more, because color fringing turns into a different color or the hue inverts. A removal amount is restricted for each color component so as to prevent the individual hue from inverting, but the hue may still invert when the removed amounts are combined into an excessive removal in the synthesis into a color image. In order to eliminate fringing of a different color, the color component to be corrected needs to be changed. However, no correction is available without that information. In particular, when an estimator disclosed in JP 2008-147980 is used, which is configured to estimate a correction amount of color fringing utilizing the image intensity slope between adjacent pixels for each color component, the estimation accuracy is not so high and the above problems are likely to occur.

SUMMARY OF THE INVENTION

This invention provides an image processing apparatus, an image processing method, and a program, which can maintain a natural tint of an image in which color fringing has been reduced.

An image processing apparatus according to the present invention is configured to perform processing for reducing color fringing in a color image that contains a plurality of color components. The image processing apparatus includes an estimator configured to estimate a color fringing amount caused by two color components in the plurality of color components, a reducer configured to reduce the color fringing in the color image by a correction amount that is based upon the color fringing amount that has been estimated by the estimator, and a correction amount obtainer configured to obtain the correction amount based upon the color fringing amount estimated by the estimator so that a color infringing region in the color image after the color fringing is reduced by the reducer is positioned in a restricted area in a chromaticity diagram. Where a first line passes a first point in the chromaticity diagram corresponding to a target pixel of the color image before the color fringing is reduced and an origin representing an achromatic color in the chromaticity diagram, the restricted area in the chromaticity diagram is located on a side of the origin with respect to a second line that is perpendicular to the first line and passes the first point, and held between two third lines that are parallel to and hold the first line, and are separated from the first line by an equal distance that is equal to or smaller than half a distance between the origin and the first point, the restricted area being held by two lines each of which passes the origin and represents a boundary between a corresponding one of the two color components and an area representing a color component made by mixing the corresponding one of the two color components and another color component with each other.

Further features of the present invention will become apparent from the following description of exemplary embodiments with reference to the attached drawings.

DESCRIPTION OF THE EMBODIMENTS

Referring now to accompanying drawings, a description will be given of embodiments of the present invention.

First Embodiment

Figure 1:
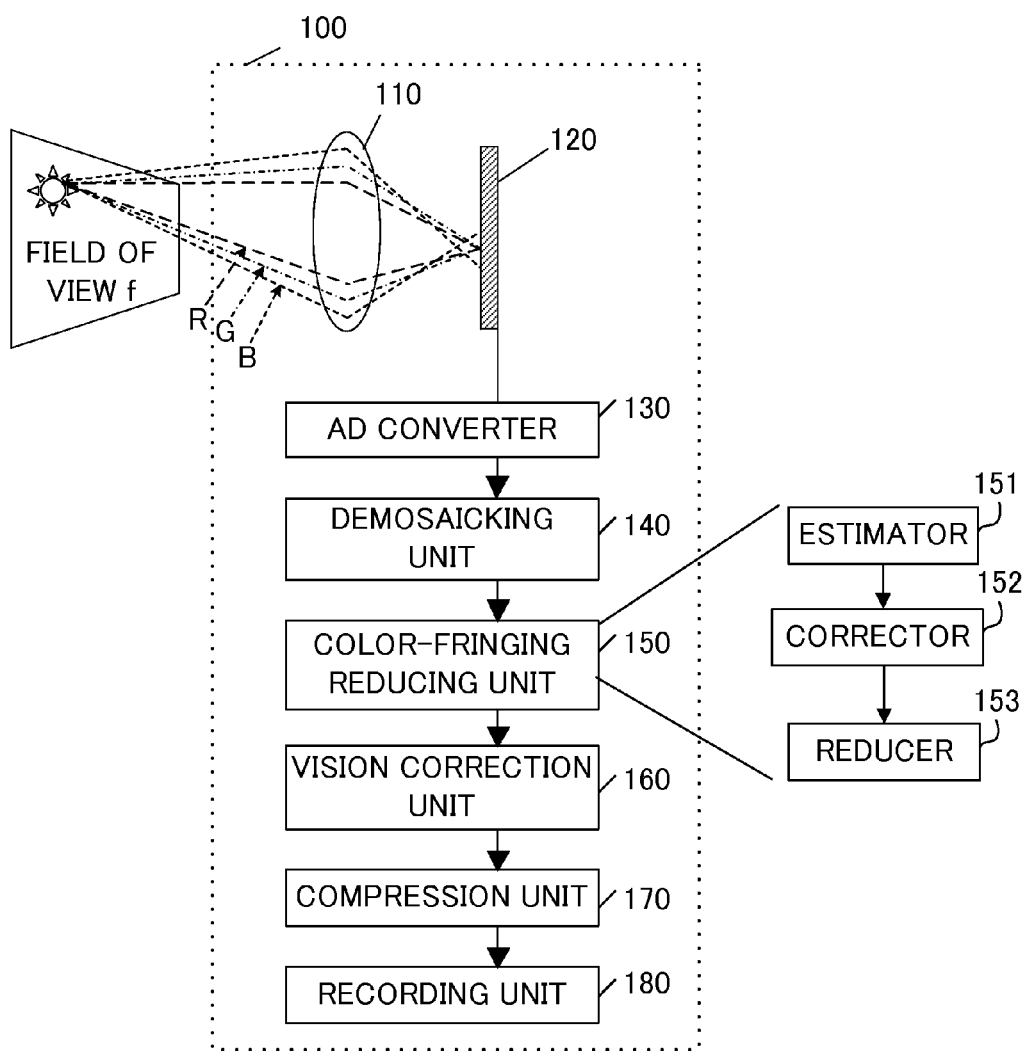
FIG. 1 is a block diagram of an image pickup apparatus according to a first embodiment of the present invention.

FIG. 1 is a block diagram of an image pickup apparatus 100 including an image processing apparatus according to a first embodiment configured to reduce color fringing in a color image. The image pickup apparatus 100 includes an imaging optical system 110, an image sensor (image pickup element) 120, an AD converter 130, a demosaicking unit 140, a color-fringing reducing unit 150, a vision correction unit 160, a compression unit 170, and a recording unit 180.

In FIG. 1, an image of a field of view (object) f is formed on the image sensor 120 through the imaging optical system 110. A chromatic aberration of the imaging optical system 110 of this embodiment is corrected for all wavelength regions to some extent: In particular, the chromatic aberration of the G wavelength band is well corrected, and more chromatic aberrations in other wavelength bands remain than that of the G wavelength band. If the correcting level of the chromatic aberration is lowered, another aberrational correction, a miniaturization, and a cost reduction can be properly promoted.

Figure 4:
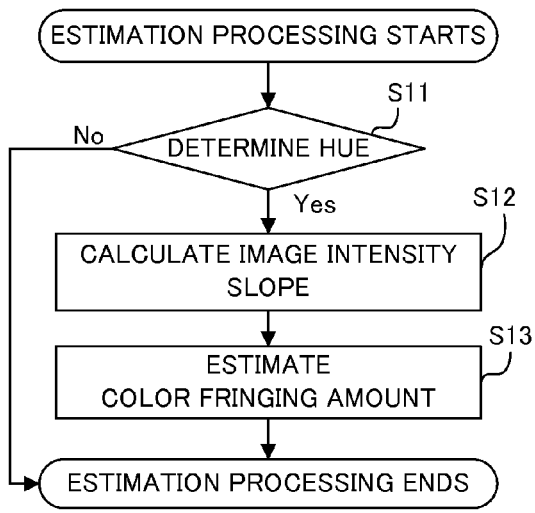
FIG. 4 is a flowchart for explaining an operation of an estimator illustrated in FIG. 1 according to the first embodiment.
Figure 5:
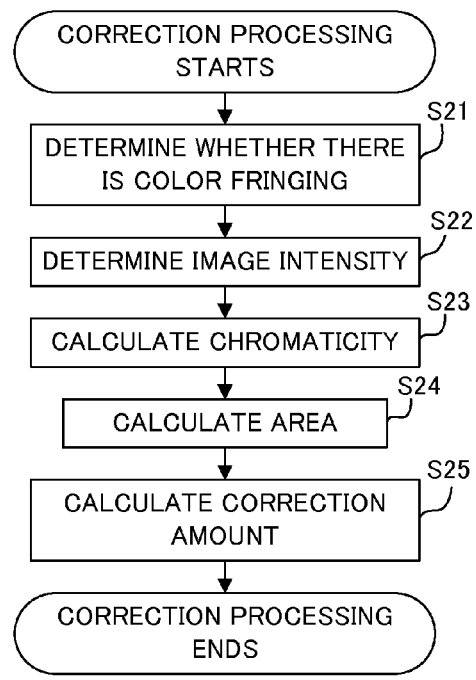
FIG. 5 is a flowchart for explaining an operation of a corrector illustrated in FIG. 1 according to the first embodiment.

The image sensor 120 performs a photoelectric conversion for an object image, and includes a single-plate color image sensor including a general primary color filter system. The primary color filter system includes three types of color filters having transmission dominant wavelength ranges near 650 nm, 550 nm, and 450 nm, as illustrated in FIG. 4 of JP 2008-147980, configured to capture color components corresponding to the RGB bands. In the single-plate color image sensor, this color filter is spatially arranged for each pixel, and can obtain the intensity of only a single color component for each pixel, as illustrated in FIG. 5 of JP 2008-147980. Thus, the image sensor outputs a color mosaic image.

Alternatively, the light may be separated into the RGB wavelength ranges using a color separating prism, and a three-plate type color image sensor may be used to form their images using different image sensors. In this case, the demosaicking unit 140 becomes unnecessary.

The AD converter 130 converts a color mosaic image output as an analogue voltage from the image sensor into digital data suitable for image processing.

The demosaicking unit 140 interpolates the color mosaic images, and generates a color image having uniform RGB color information for all pixels. The interpolating method is not limited. Due to the chromatic aberration of the imaging optical system 110, the generated color image becomes an image in which resolutions of the RB components are inferior to the resolution of the G component.

Figure 6A:
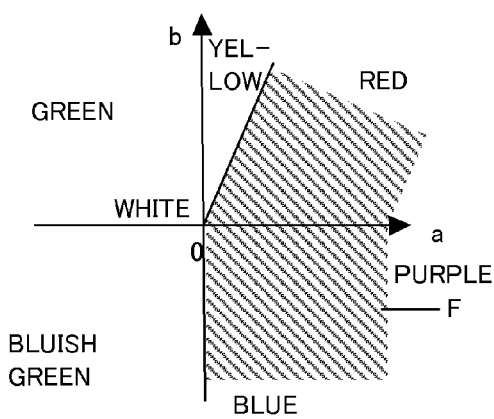
FIGS. 6A and 6B are ab chromaticity diagrams according to the first embodiment.
Figure 6B:
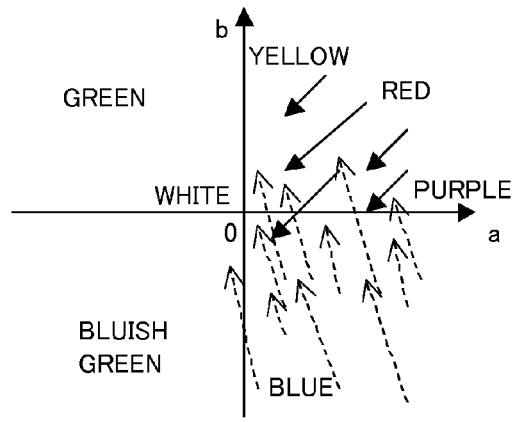

As a result, red and blue blur in the boundary between brightness and darkness, as illustrated in FIGS. 6A-6B of JP 2008-147980, and artifacts occur around bright regions like red, blue, and purple edgings in which red and blue are mixed.

Herein, the fringing degrees are different between the R and B components due to the characteristic of the imaging optical system, the spectral distribution of the light source in the image, etc. Even when the image sensor 120 is a complementary color filter, the color image can be similarly obtained from the RGB color components through the color conversion processing.

As described later, the color-fringing reducing unit 150 constitutes an image processing apparatus configured to extract a color fringing area through spatial operations, to estimate a color fringing amount, and to reduce the estimated amount from the input color image through subtracting etc.

Next, the vision correction unit 160 performs various processing used to mainly improve an appearance of the color image, such as a tone curve (gamma) correction, a chroma emphasis, a hue correction, and an edge emphasis.

Next, the compression unit 170 compresses a corrected color image using a method of JPEG, etc. so as to reduce the size of a color image for recording.

Actually, those components from the image sensor 120 to the recording unit 180 may not necessarily be separate devices, and a single microprocessor (microcomputer) may perform processing that serves as a plurality of components. The digital image signal that has experienced the compression processing is recorded by the recording unit 180 that may be a recording medium, such as a flash memory.

Figure 2A:
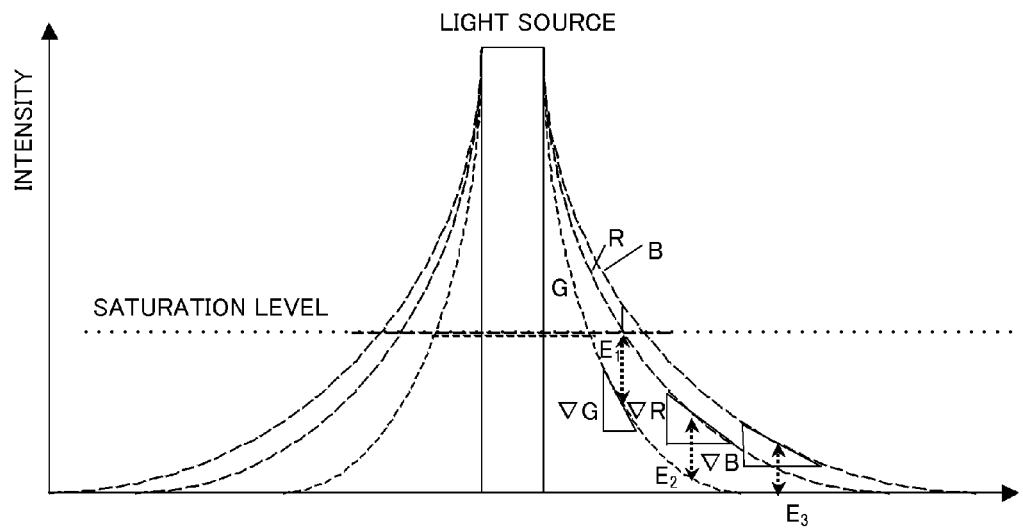
FIG. 2A is a view of typical profiles of an R plane, a B plane, and a G plane for a highly bright object according to the first embodiment.

FIG. 2A is typical profiles of the RGB components for a highly bright object. An abscissa axis denotes a section in the image, and an ordinate axis denotes intensities of the RGB components. In FIG. 2A, a highly bright object exists in the center which exceeds the saturation level. In the periphery around the highly bright object that is not originally bright, the skirt of the profile spreads due to the blurred light from the highly bright object caused by the aberrations and flare. The fringing intensity depends upon the brightness of the highly bright object, and becomes exponentially weaker when a distance from the highly bright object increases.

As described in JP 2008-147980, the RGB components saturate with sizes slightly larger than the original, highly bright object as a captured image, and a white saturated area is formed. The R and B components have approximately the same profiles. From here, the G component gradually attenuates. The saturation radii of the RB components are wider and the image intensity differences between the G component and the RB components increase, and the magenta tint becomes stronger.

When the RB components reach the saturation radii, the RB components start attenuating. Then, the image intensity differences between the G component and the RB components reduce, and purple fringing appears. The G component reaches the end of the skirt at a certain point, and then only the RB components have intensities and purple fringing having a high chroma appears.

The magenta fringing and purple fringing do not originally exist and cause unnatural colors around the brightness saturated region. This embodiment intends to reduce color fringing, such as purple fringing, red fringing or blue fringing, which is caused by the RB component and does not originally exist. The color-fringing reducing unit 150 reduces the unnatural color fringing and restores natural tints.

Figure 3:
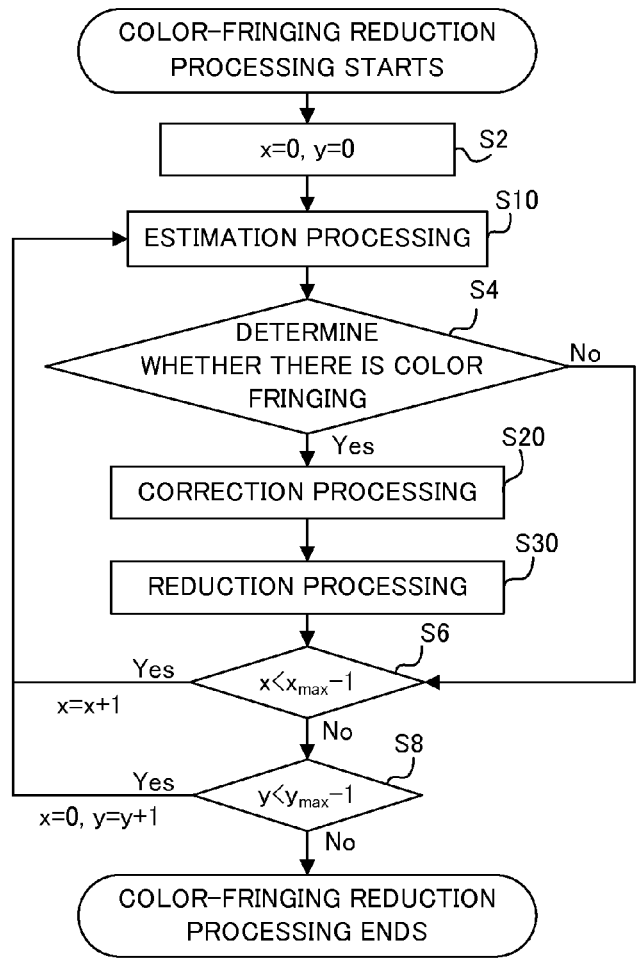
FIG. 3 is a flowchart illustrating a whole operation of a color-fringing reducing unit illustrated in FIG. 1 according to the first embodiment.

FIG. 3 is a flowchart of image processing performed by the color-fringing reducing unit 150, and "S" stands for a step. The flowchart illustrated in FIG. 3 can be implemented by a program which enables a computer to serve each step (means). This is true of other flowcharts which will be described later.

The color-fringing reducing unit 150 includes an estimator 151, a corrector 152, and a reducer 153, and corrects the RB components utilizing the G component as a reference component.

As illustrated in FIG. 3, the color-fringing reducing unit 150 starts image processing by setting a pixel having a coordinate (x, y)=(0, 0) in the input image to a target pixel (S2). Then, for that pixel, estimating processing by the estimator 151 (S10), a determination of color fringing (S4), correcting processing by the corrector 152 (S20), and reducing processing by the reducer 153 (S30) are performed. Next, an output image is output after x and y are incremented up to their maximum values (S6, S8). In the following description, the color fringing determination (S4) is part of the correcting processing S20 (S21) but may be part of the estimating processing S10 or may be independent of them, as illustrated in FIG. 3.

FIG. 4 is a flowchart for explaining an operation of the estimator 151 in the color-fringing reducing unit 150, and "S" stands for the step.

Referring to FIG. 4, the corrector 151 initially determines whether the target pixel (x, y) is a color fringing pixel, or more particularly calculates a hue (which is a difference of a tint, such as red and yellow) of the target pixel so as to make a simple determination of whether the hue is a hue considered to be color fringing (S11).

Herein, the "hue considered to be color fringing" is defined by two hue angles $h_{min}$ and $h_{max}$. Where h denotes a hue angle of the target pixel, it is the hue considered to be color fringing when the following expressions are satisfied: For example, in red(0°), yellow(60°), green(120°), light blue(180°), blue (240°), and purple(300°), $h_{min}$ and $h_{max}$ are set to the hue angle of purple that does not originally exist.

$$h_{min} \leq h \leq h_{max} \quad \text{Expression 1}$$

In determining whether it is a color fringing pixel, the image intensity of the G component as a reference is addressed in the target pixel (x, y) and it is not determined as a color fringing pixel when it is considered to be saturated. This is because when the reference color component is saturated in the highly bright object, the other color components are likely to saturate and the color fringing is not likely to occur. The saturation, as used herein, is satisfied when the intensity has a threshold of about 0.9 or higher where the image intensity has a value between 0 and 1.

When it is determined that there is no color fringing pixel in S11, the processing ends by setting the color fringing amounts $E_R$ and $E_B$ of the target pixel to 0 and the flow moves to the next pixel.

For the color fringing pixel determined in S11, the slope of the signal intensity for each of the RGB color components (image intensity slope) is calculated (S12). When the attenuation for each color component of the image around the saturation brightness is addressed, the attenuation of the G component is converged but the attenuations of the RB components are not converged and the fringing occurs.

When the attenuation is converged, the intensity slope becomes small, and when the attenuation is not converged, the intensity slope becomes large. Therefore, whether or not the attenuation is converged can be approximately determined based upon the image intensity slope for each color component. Since the image intensity and the image intensity slope are thus effective in specifying the color fringing region and in estimating the color fringing amount, the estimator 151 estimates a color fringing amount for each pixel (region) utilizing a slope (gradient) of the signal intensity for each color component between neighboring pixels. Another method disclosed in the prior art reference may be used for the estimation.

Assume that $\nabla_R$, $\nabla_G$, and are $\nabla_B$ image intensity slopes (gradients) for respective color components. Then, $\nabla_R$, $\nabla_G$, and $\nabla_B$ are given by the following expressions:

$$\nabla_R = \left(\frac{dR}{dx}, \frac{dR}{dy}\right) \equiv \quad \text{Expression 2}$$
$$\left(\frac{R(x+1, y) - R(x-1, y)}{2}, \frac{R(x, y+1) - R(x, y-1)}{2}\right)$$

$$\nabla_G = \left(\frac{dG}{dx}, \frac{dG}{dy}\right) \equiv$$
$$\left(\frac{G(x+1, y) - G(x-1, y)}{2}, \frac{G(x, y+1) - G(x, y-1)}{2}\right)$$

-continued
$$\nabla_B = \left(\frac{dB}{dx}, \frac{dB}{dy}\right) \equiv$$
$$\left(\frac{B(x+1, y) - B(x-1, y)}{2}, \frac{B(x, y+1) - B(x, y-1)}{2}\right)$$

Herein, R(x+1, y), G(x+1, y), and B(x+1, y) are values of neighboring pixels on the right side of the target pixel for the RGB components. R(x−1, y), G(x−1, y), and B(x−1, y) are values of neighboring pixels on the left side of the target pixel for the RGB components. R(x, y+1), G(x, y+1), and B(x, y+1) are values of neighboring pixels above the target pixel for the RGB components. R(x, y−1), G(x, y−1), and B(x, y−1) are values of neighboring pixels under the target pixels for the RGB components. In the operation of the image intensity slope, the calculating range may be enlarged, or a diagonally located pixel may be used.

Nevertheless, in view of the operating amount and the effect, the above image-intensity-slope calculating method is suitable.

Next, color-fringing estimated amounts $E_R$, $E_G$, and $E_B$ are calculated by multiplying the absolute values of image intensity slopes $\nabla_R$, $\nabla_G$, and $\nabla_B$ of the RGB components by parameters $k_R$, $k_G$, and $k_B$ as follows (S13):

$$\begin{cases} E_R = k_R |\nabla R| \\ E_G = k_G |\nabla G| \\ E_B = k_B |\nabla B| \end{cases} \quad \text{Expression 3}$$

The coefficients $K_R$, $K_G$, and $K_B$ are positive values and about 3 is suitable. In the region where RB components are saturated, the image intensity slope becomes 0 and the image intensity slope where there is no saturation cannot be obtained. Accordingly, the image intensity slope of the G component is utilized to calculate the image intensity slope for that region. Thus, Expression 3 calculates the color-fringing estimated amount $E_G$. The color-fringing estimated amount $E_G$ is used for the corrector 152 as follows.

As described above, the color-fringing estimated amounts $E_R$ and $E_B$ are calculated in the color fringing pixel and the estimating processing S10 by the estimator 151 ends and the flow moves to processing by the corrector 152:

FIG. 5 is a flowchart for explaining an operation of the corrector 152 in the color-fringing reducing unit 150, and "S" stands for the step. The corrector 152 corrects each color-fringing estimated amount so that the color after the color fringing is reduced becomes a natural color, by utilizing the color-fringing estimated amounts $E_R$ and $E_B$ estimated by the estimator 151.

Referring to FIG. 5, the corrector 152 initially determines whether there is color fringing in the color fringing region utilizing the image intensity slope calculated by S11 and an image intensity slope ratio between the reference color component (G component) and the color component of the color fringing (S21).

Whether there is color fringing in the color fringing region is determined based upon the slope of the signal intensity, and it is determined that the there is color fringing when the slope has a predetermined value or higher. In this case, the color fringing region can be more precisely specified by calculating and comparing not only the slopes of the RB signal intensities but also the slope of the G signal intensity as the reference component. For example, when the RB signal intensities have slopes higher than that of the G signal intensity, it is determined that the color fringing is highly likely. Since the estimating method of this embodiment is simple in calculation but is likely to contain errors, the amount estimated by the estimator needs to be corrected as described later.

When there is no color fringing, the color-fringing estimated amount calculated by the estimator 151 is set to 0. The estimator 151 may determine the color fringing.

Assume that $\alpha_{RG}$ is a threshold of a ratio of an image intensity slope of the R component for the G component. Then, the corrected color-fringing estimated amount $E_R'$ can be expressed as follows:

$$E_R' = \begin{cases} E_R & (\nabla R/\nabla G \geq \alpha_{RG}) \\ 0 & (\nabla R/\nabla G < \alpha_{RG}) \end{cases} \quad \text{Expression 4}$$

The B component can be similarly expressed as follows:

$$E_B' = \begin{cases} E_B & (\nabla B/\nabla G \geq \alpha_{BG}) \\ 0 & (\nabla B/\nabla G < \alpha_{RG}) \end{cases} \quad \text{Expression 5}$$

Herein, the thresholds $\alpha_{RG}$ and $\alpha_{BG}$ as the ratio of the image intensity slope depend upon the characteristic of the imaging optical system, but around 2 is suitable.

Figure 2B:
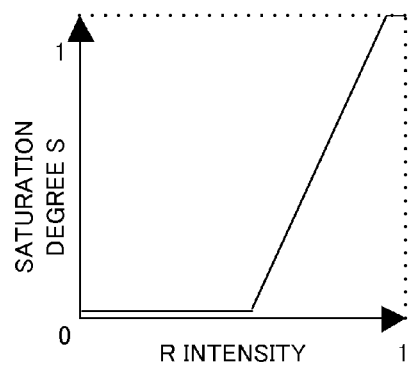
FIG. 2B is a view of a characteristic of a nonlinear conversion according to the first embodiment.

Next, the corrector 152 performs a nonlinear conversion for the intensity of the R component and generates the saturation degree $S_R$ (S22). This nonlinear conversion indicates whether or not the R component is saturated, and it is 1 for a region where the R component is saturated, and 0 for a region where the R component is not saturated. Thus, $S_R$ may be binary such as 0 and 1, but may be a continuously changing value between 0 and 1, as illustrated in FIG. 2B. In that case, the saturation degree $S_R$ may be expressed as follows:

$$S_R = \begin{cases} 0 & (R \leq 0.5) \\ (R - 0.5)/(0.9 - 0.5) & (0.5 < R < 0.9) \\ 1 & (R \geq 0.9) \end{cases} \quad \text{Expression 6}$$

A color-fringing estimated amount $E_R$ or $E_G$ calculated by utilizing the saturation degree $S_R$ is selected. In other words, when $S_R$ may be binary such as 0 and 1, newly estimated amount $E_R''$ is defined as follows:

$$E_R'' = \begin{cases} E_R' & (S_R = 0) \\ E_G & (S_R = 1) \end{cases} \quad \text{Expression 7}$$

When $S_R$ is a continuously changing value between 0 and 1, a newly estimated amount $E_R''$ is expressed as follows:

$$E_R'' = (1 - S_R)E_R' + S_R E_G \quad \text{Expression 8}$$

Similarly, the color-fringing estimated amount $E_B''$ of the B component is expressed as follows where $S_B$ denotes its saturation degree:

$$E_B'' = \begin{cases} E_B' & (S_B = 0) \\ E_G & (S_B = 1) \end{cases} \quad \text{Expression 9}$$

When $S_R$ is a continuously changing value between 0 and 1, it is expressed as follows:

$$E_B'' = (1 - S_B)E_B' + S_B E_G \quad \text{Expression 10}$$

Thus, even when it is determined in S21 that there is color fringing, if the RB components are saturated, the pixel that is not determined to be color fringing will be corrected.

Next, the corrector 152 calculates the chromaticity by subtracting the chromaticity of the target pixel and the color-fringing estimated amounts $E_R''$ and $E_B''$ corrected in S22 from each color component (S23). The chromaticity has information that contains the hue and chroma. The chromaticity is calculated as in Expressions 1 and 2 in JP 2008-147981 for the intensity of each of the RGB components:

$$\begin{pmatrix} x \\ y \\ z \end{pmatrix} = \begin{pmatrix} 0.41 & 0.36 & 0.18 \\ 0.21 & 0.75 & 0.07 \\ 0.02 & 0.12 & 0.95 \end{pmatrix} \begin{pmatrix} R \\ G \\ B \end{pmatrix} \quad \text{Expression 11}$$

The coefficients in Expression 11 are general coefficients used for a display configured to convert the RGB coordinate into the xyz colorimetric system. The following expression is used to convert the xyz colorimetric system into the simple Lab colorimetric system. This embodiment utilizes the simple Lab colorimetric system in order to reduce the calculation cost, but the original, non-simple Lab colorimetric system may be used because it is closer to the human senses.

$$\begin{cases} a = 5(x - y) \\ b = 2(y - z) \end{cases} \quad \text{Expression 12}$$

A description will now be given of the ab chromaticity diagram and the relationship between the ab chromaticity diagram and the RB components. FIG. 6A illustrates the ab chromaticity diagram. In FIG. 6A, blue is located at the fourth quadrant, and the position moving to the first quadrant is getting reddish and becoming purple and magenta. The position in the first quadrant moving to the second quadrant is getting reddish and then yellowish from magenta.

The color fringing caused by the influences of the RB components has a tint of a (color fringing) region expressed by a diagonal-line region F in the ab chromaticity diagram in FIG. 6A. This region F changes depending upon the color fringing, and is not necessarily limited to the diagonal-line region and for example, a hue of part in the third quadrant may be recognized as blue fringing.

When the color-fringing estimated amount $E_B''$ from the B component is removed from the B component in the ab chromaticity diagram, the position moves in the upper left direction like a dotted arrow in FIG. 6B. A starting point of the arrow is the pre-removal chromaticity and the tip is the chromaticity after the color-fringing estimated amount $E_B''$ is removed. When the color-fringing estimated amount $E_R''$ is similarly removed from the R component, the position moves in the lower left direction like a solid arrow in FIG. 6B.

Figure 7:
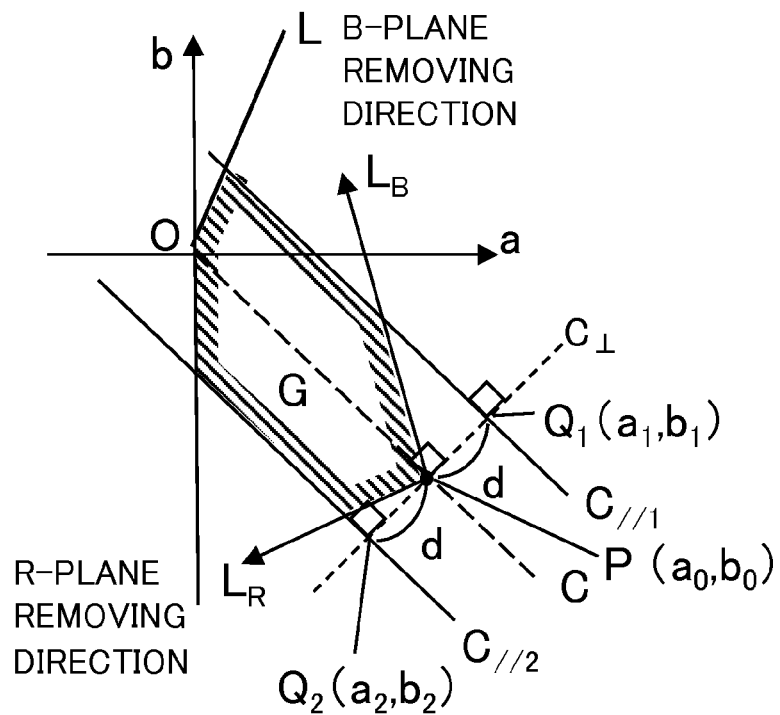
FIG. 7 illustrates a restricted area in the ab chromaticity diagram according to the first embodiment.

Next, the corrector 152 calculates a restricted area (S24). FIG. 7 illustrates the restricted area in the chromaticity coordinate. Now assume that $P(a_0, b_0)$ is a (first) point in the ab chromaticity diagram corresponding to a target pixel of an input color image before the color fringing is reduced. Then, a (first) line C that passes the point P and the origin O representing an achromatic color is expressed as follows:

$$C : b = (b_0/a_0)a \quad \text{Expression 13}$$

Next, assume that $C_\perp$ is a (second) line that passes the point P and perpendicularly crosses the line C, and $C_{//1}$ and $C_{//2}$ are two (third) lines parallel to the line C where the third line $C_{//1}$ passes $Q(a_1, b_1)$ and the third line $C_{//2}$ passes $Q(a_2, b_2)$ and $Q(a_1, b_1)$ and $Q(a_2, b_2)$ are located on the line $C_\perp$ and separated from the line C by an equal distance of d from the point P. Then, the line $C_\perp$ is expressed as follows:

$$C_\perp : b = -(a_0/b_0)(a-a_0) + b_0 \qquad \text{Expression 14}$$

The two lines $C_{//1}$ and $C_{//2}$ are expressed as follows and distant from the line C by an equal distance, and the line C is held by the two parallel lines $C_{//1}$ and $C_{//2}$:

$$C_{//1} : b = (b_0/a_0)(a-a_1) + b_1$$

$$C_{//2} : b = (b_0/a_0)(a-a_2) + b_2 \qquad \text{Expression 15}$$

In addition, in the ab chromaticity diagram, assume $L_R$ is a (fifth) line that represents a locus of a chromaticity change when only the R component is removed, and $L_B$ is a (fifth) line that represents a locus of a chromaticity change when only the B component is similarly removed. The chromaticity changing direction is constant when each of the RB components is independently removed, and slopes of the two or more (fifth) lines are expressed as follows from Expressions 7 and 8: A slope of $L_R$ is 0.38 and a slope of $L_B$ is −3.2. Since the lines $L_R$ and $L_B$ pass the point P, the following expressions are established:

$$L_R : b = 0.38(a-a_0) + b_0$$

$$L_B : b = -3.2(a-a_0) + b_0 \qquad \text{Expression 16}$$

Thus, the restricted area is an area enclosed by four lines $C_{//1}$, $C_{//2}$, $L_R$, and $L_B$ and lines that restrict the color fringing region F used for hue determination S10 (or a region G enclosed by diagonal lines in FIG. 7.

In other words, the restricted area is provided in the color fringing region F on the origin side with respect to the line $C_\perp$, held between the two lines $C_{//1}$ and $C_{//2}$, and between the two lines $L_R$ and $L_B$ in this embodiment.

Herein, the lines that forms the region F include the line of a=0 and the line L in the first quadrant in FIG. 7, and is generally expressed as follows using a hue angle h:

$$b = \tan(h) \times a \qquad \text{Expression 17}$$

As the distance d increases, the restricted area is wider and permits a wider hue change. On the other hand, as the distance decreases, the restricted area finally accords with the line C or the chroma reducing processing. Since the post-removal point is located around the origin, the chroma is low and even a relatively big hue change does not cause a sense of discomfort. When the point becomes distant from the origin, the chroma is high and the hue change is likely to stand out and to cause a sense of discomfort. Therefore, the distance d having a large value is less effective in restriction. The determination may be made on the basis of the chroma. Accordingly, a value that is equal to or smaller than half the distance from the origin O to the point P may be proper. Although this embodiment equally sets the distance between the line $C_{//1}$ and the line C and the distance between the line $C_{//2}$ and the line C, the distances may not be equally set as long as Expression 18 is satisfied:

$$0 < d \leq \frac{1}{2} \left| \sqrt{a_0^2 + b_0^2} \right| \qquad \text{Expression 18}$$

Next, the color-fringing estimated amount is corrected so as to limit the color-fringing estimated amounts $E_R''$ and $E_B''$ to the restricted area (S25). In other words, the color-fringing estimated amount beyond the restricted range is replaced with a value of an outline of the restricted range. If the color-fringing estimated amounts $E_R''$ and $E_B''$ calculated in S22 are independently removed without considering their mutual relationship, then even when a limitation is applied so that each color-fringing estimated amount does not become excessively high, the changing direction of each color-fringing estimated amount is combined into a combined direction.

Figure 8:
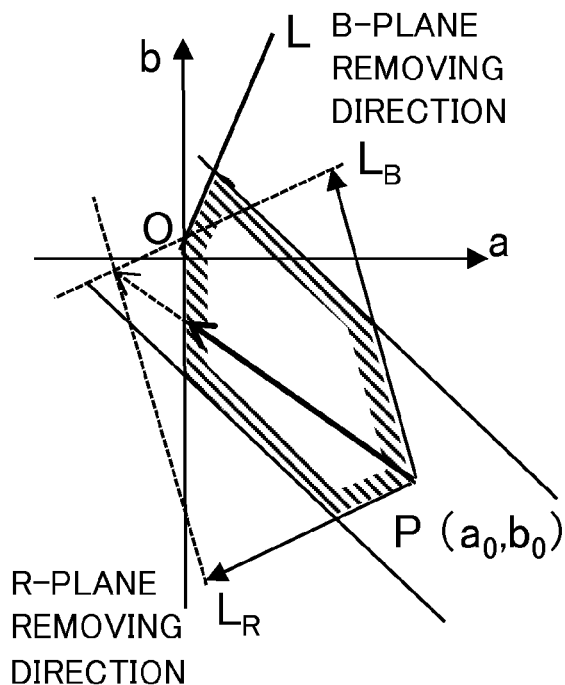
FIG. 8 is a view illustrating a changing direction on the chromaticity coordinate when R and B components are simultaneously corrected according to the first embodiment.

As a consequence, when each vector is combined, the resultant vector may exceed the hue area that is considered to be color fringing as illustrated in FIG. 8. When the resultant vector exceeds the hue area that is considered to be color fringing, the hue is inverted, the purple fringing becomes green, and the resultant image causes a sense of discomfort. In addition, even if it is within the color-fringing hue region, bluish violet fringing turns into red fringing.

In order to prevent such an unintentional change, a correction is made, for example, by making a reduction by the same magnification of the color-fringing estimated amounts $E_R''$ and $E_B''$ so that the post-removal chromaticity can be located in the region calculated in S24, and final color-fringing estimated amounts $E_R'''$ and $E_B'''$ are obtained. The processing by the corrector 152 ends.

The reducer 153 subtracts the color-fringing estimated amounts $E_R'''$ and $E_B'''$ corrected by the corrector 152 from the intensities of the RB components, and obtains new intensities of the RB components as follows:

$$\begin{cases} R = R - E_R''' \\ B = B - E_B''' \end{cases} \qquad \text{Expression 19}$$

Thus, the color image in which the RB components are corrected is supplied as an output of the color-fringing reducing unit 150 to the vision correction unit 160.

While this embodiment discusses the color image pickup apparatus including the imaging optical system 110 to the recording unit 180, part or all of components except the color-fringing reducing unit 150 may be provided in the separate apparatus and this embodiment may be configured as an image processing apparatus configured to reduce color fringing. In this case, the image processing apparatus may read (or input) a color image that has been taken by a color image pickup apparatus separate from that of this embodiment, and stored in a recording medium, such as a semiconductor memory and a magnetic/optical disk. This is true of other embodiments.

This embodiment can correct color fringing containing two color components or more without causing a hue inversion or a sense of discomfort. In addition, various color fringing can be corrected without switching a color component as an object of color fringing. Moreover, since a limitation is applied without causing a big hue change, a natural image in which color fringing has been reduced can be obtained.

Second Embodiment

The image processing apparatus of the second embodiment has a structure similar to that of the first embodiment, but the color-fringing reducing unit is different. Similar to the first embodiment, the color-fringing reducing unit of this embodiment corrects the RB components utilizing the G component as a reference component. In addition, similar to the first embodiment, the color-fringing reducing unit of this embodiment includes an estimator, a corrector, and a reducer, but the region calculation (S24) performed by the corrector 152 is different from the first embodiment.

The estimator of this embodiment estimates the color-fringing estimated amounts $E_R$ and $E_B$ of the RB components in the input color image. The estimating method of the color-fringing amount is not particularly limited, such as an image intensity slope and other estimating methods disclosed in JPs 2008-147980 and 2008-147981, as long as it is used to estimate the color-fringing estimated amount of each color component of the input color image.

The corrector of this embodiment corrects each color-fringing estimated amount utilizing the color-fringing estimated amounts $E_R$ and $E_B$ calculated by the estimator so that the color after the color-fringing is reduced does not cause a sense of discomfort. The corrector executes each step illustrated in FIG. 5 similarly to the first embodiment, but is different in the region calculating method. The region calculating step of this embodiment restricts the region using a hue angle so as to limit the hue change before and after the color-fringing estimated amount is removed.

Initially, a hue angle h of a point $P(a_0, b_0)$ illustrated in the ab chromaticity diagram corresponding to the target pixel in the input color image is calculated. The hue angle h is calculated as follows:

$$h = \tan^{-1}(b_0/a_0) \quad \text{Expression 20}$$

The hue is limited by two lines $C_{+\Delta h}$ and $C_{-\Delta h}$ that pass the origin O and have hue angles of h±Δh, where Δh is a hue limiting angle. Herein, the lines $C_{+\Delta h}$ and $C_{-\Delta h}$ are expressed by the following expressions, and are (fourth) lines created by rotating the line C by an equal angle around the origin O:

$$C_{+\Delta h}: b = \tan(h + \Delta h) \times a$$

$$C_{-\Delta h}: b = \tan(h - \Delta h) \times a \quad \text{Expression 21}$$

Figure 9:
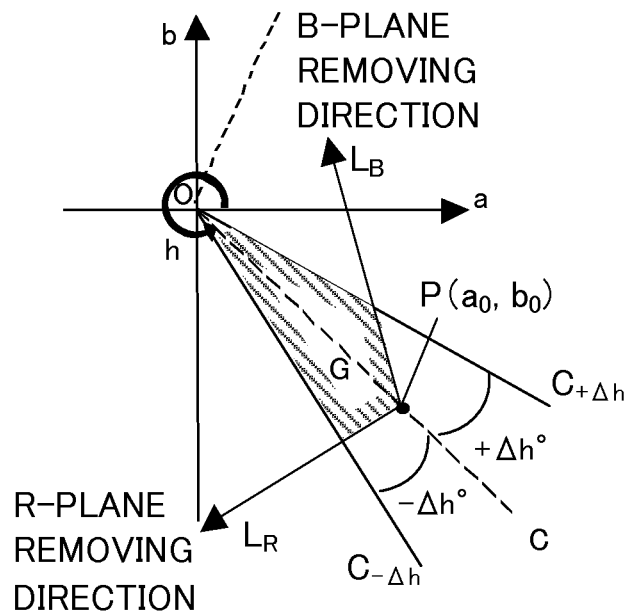
FIG. 9 is a view for explaining a calculation of a region restricted by a hue angle on the chromaticity coordinate according to a second embodiment.

Finally, as illustrated in FIG. 9, the restricted area becomes a region enclosed by the two lines $C_{+\Delta h}$ and $C_{-\Delta h}$ and the lines $L_R$ and $L_B$ illustrated in the first embodiment (or the region G enclosed by diagonal lines in FIG. 9). In other words, the restricted area G is located in the color fringing region F on the origin side with respect to the line $C_\perp$, held by two lines $C_{+\Delta h}$ and $C_{-\Delta h}$ and two lines $L_R$ and $L_B$ in this embodiment.

Herein, the hue limiting angle Δh may use a value from 0 to 180°, which is a value set as a parameter representing a permissible hue change. An excessively large value is ineffective in restricting the hue, and thus actually an angle smaller than 90°, such as 45° or smaller. Moreover, in order to prevent the hue after the color fringing is reduced from causing a sense of discomfort, an angle of about 20° to about 30° is suitable. In order to equalize the hue change from the point P, angles of the two lines $C_{+\Delta h}$ and $C_{-\Delta h}$ around the origin from the line C are made equal but the equal angle is not necessarily required as long as the above angular requirement is satisfied.

The correction amount calculating step corresponding to S25 makes such a correction that the color-fringing estimated amounts $E_R'$ and $E_B'$ can fall within the region calculated by the region calculating step.

The reducer subtracts the color-fringing estimated amounts $E_R'$ and $E_B'$ corrected by the corrector from the intensity of the R and B components respectively, and the color image in which the RB components are corrected is output to the vision correction unit.

The second embodiment sets the restricted area that causes a hue change smaller than that of the first embodiment, lowers the chroma of the color fringing, and can naturally reduce the color fringing.

Third Embodiment

The image processing apparatus of the third embodiment has a structure similar to the image processing apparatuses of the first and second embodiments but is different in the color-fringing reducing unit. Similar to the first and second embodiments, the color-fringing reducing unit of this embodiment corrects the RB components utilizing the G component as a reference component. In addition, the color-fringing reducing unit of this embodiment includes an estimator, a corrector, and a reducer, but the region calculation (S24) performed by the corrector 152 is different from that of the second embodiment. Since the estimator and the reducer are similar to those of the second embodiment, a description thereof will be omitted.

The corrector of this embodiment combines the removing results of the color-fringing estimated amounts $E_R$ and $E_B$ calculated by the estimator and corrects each color-fringing estimated amount so that the color after the color fringing is reduced does not cause a sense of discomfort. Similar to the second embodiment, the corrector executes each step in FIG. 5, but there is a changing direction calculating step between the region calculation (S24) and the correction amount calculation (S25) and the contents of the correction amount calculation (S25) is different from that in the second embodiment.

Initially, similar to the second embodiment, the corrector calculates the chromaticity of the target pixel (x, y) in the chromaticity calculation (S23), and calculates the restricted area on the chromaticity coordinate in the region calculation (S24). The second embodiment permits any corrections within this region, but this embodiment imposes a stronger constraint.

In other words, the corrector calculates the changing directions before and after the color-fringing estimated amounts $E_R$ and $E_B$ estimated by the estimator, and makes corrections without changing the directions. Since the color-fringing estimated amounts $E_R$ and $E_B$ are calculated by the estimator based upon the characteristic of the input color image, maintaining the changing direction enables the correction to match the characteristic of the image.

Figure 10:
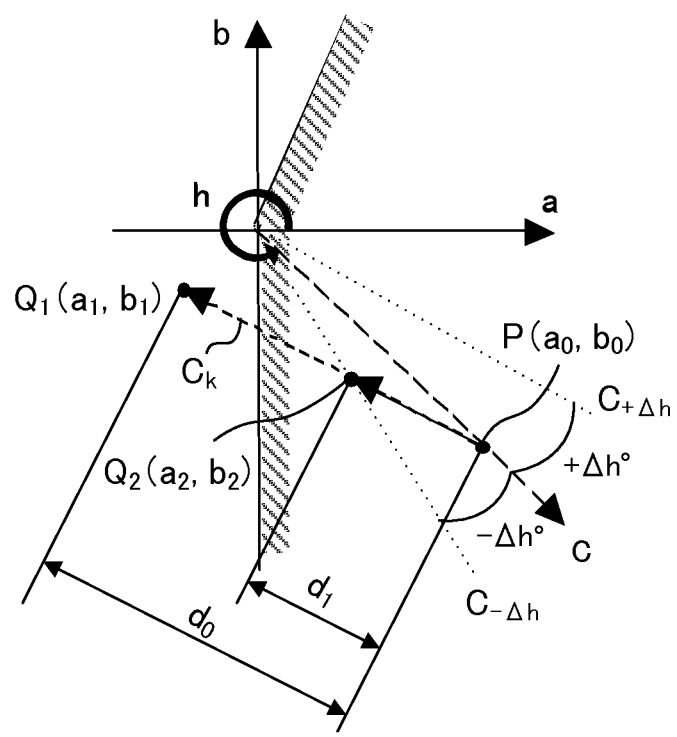
FIG. 10 is a view for explaining a correction amount calculating step configured to restrain a hue angle change within a restricted angle on the chromaticity coordinate according to a third embodiment.

FIG. 10 is a chromaticity diagram for explaining the way of maintaining a hue angle change within a restricted angle. As illustrated, in the changing direction calculating step, a line $C_k$ that connects a point $P(a_0, b_0)$ before the color-fringing estimated amount is removed and a (second) point $Q_1(a_1, b_1)$ with each other is calculated.

Next, the corrector calculates an intersection $Q_2(a_2, b_2)$ between the line $C_k$ and a line $C_{-\Delta h}$ that passes the origin O and represents the restricted angle in the correction amount calculation (S25). Since there are two lines that pass the origin and represent the restricted angle, there are two intersections (therefore there is the other intersection (not illustrated in FIG. 10) between the line $C_k$ and the line $C_{+\Delta h}$) but the intersection $Q_2(a_2, b_2)$ is selected because it is located in the color-fringing reducing direction.

Next, a ratio r is calculated between a distance $d_0$ between the $P(a_0, b_0)$ and $Q_1(a_1, b_1)$ and a distance $d_1$ between the P $(a_0, b_0)$ and $Q_2 (a_2, b_2)$. At this time, when the distance $d_0$ is shorter than the distance $d_1$, it is unnecessary to correct the color-fringing estimated amount and thus the ratio r becomes $d_1/d_0$ as follows:

$$r = \begin{cases} d_1/d_0 & (d_1 < d_0) \\ 1 & (d_1 \geq d_0) \end{cases} \quad \text{Expression 22}$$

New color-fringing estimated amounts $E_R'$ and $E_B'$ that do not exceed the hue restricting angle can be calculated by multiplying the color-fringing estimated amounts $E_R$ and $E_B$ by the calculated ratio r as follows:

$$\begin{cases} E'_R = r \times E_R \\ E'_B = r \times E_B \end{cases} \quad \text{Expression 23}$$

Thus, the corrector does not make a correction when the post-removal chromaticity falls within the restricted area, and makes a correction when the post-removal chromaticity deviates from the restricted area. When the hue exceeds the restricted area, the correction amount is restricted so that the hue change is restricted by the line that restricts the area calculated in the region calculation (S24).

This embodiment enables the corrected image to match the characteristic of the input color image by according the color-fringing reducing amount of each color with the line in the combined direction after the color fringing is reduced. In addition, even when there is an estimation error of the color fringing correction amount due to noises in the image, the stable color-fringing reducing effect can be obtained because the error is restrained by the restricting area of the hue.

Fourth Embodiment

Figure 11:
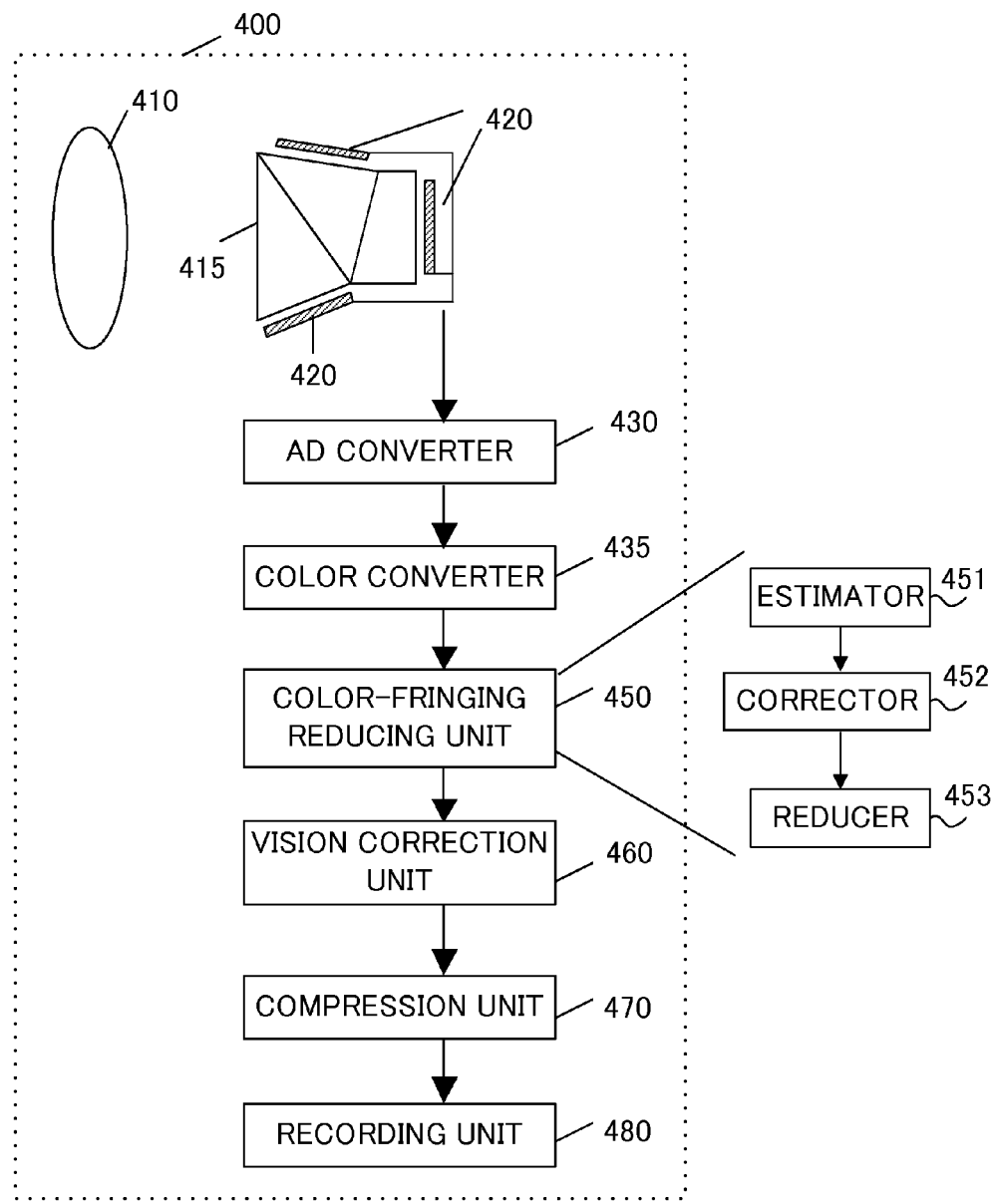
FIG. 11 is a block diagram of an image pickup apparatus according to a fourth embodiment of the present invention.

FIG. 11 is a block diagram of a color image pickup apparatus 400 including an image processing apparatus according to a fourth embodiment configured to reduce color fringing in a color image. The color image pickup apparatus 400 includes an imaging optical system 410, a color separating prism 415, an image sensor 420, an AD converter 430, a color-fringing reducing unit 450, a vision correction unit 460, a compression unit 470, and a recording unit 480.

The image sensor 420 is made of a three-plate type different from the first embodiment, and accordingly the color separating prism 415 is added and the demosaicking unit 140 in the first embodiment becomes unnecessary.

A ray from an object forms an image on the image sensor 420 through the imaging optical system 410 and the color separating prism 415. The light reaches different image sensors 420 for each of the RGB wavelength bands since the traveling direction of the ray is different in the color separating prism depending upon the wavelength of the light. Thus, the image sensor 420 has no color filter, and an image corresponding to each of the RGB color components is acquired.

Similar to the first embodiment, assume that the chromatic aberration of the imaging optical system 410 is well corrected in the G wavelength band, and the chromatic aberrations remain in the R and B wavelength bands.

The chromatic aberration is correctible in the three-plate type by adjusting a position of each image sensor in the optical axis direction, but this configuration is not resistant to fluctuations of the aberrational amount caused by a zoom position of the optical system. Thus, this embodiment does not perform such an adjustment, and the resolutions of RB components are inferior to the resolution of the G component. In a color image that synthesizes these three color components with one another, an artifact like purple edging occurs as in the first embodiment.

The AD converter 430 converts an image of each of the RGB color components output as an analog voltage from the three image sensors into digital data suitable for the following image processing.

The color converter 435 converts a color expression from RGB to YUV. This processing utilizes a matrix operation, and outputs three or YUV components as in the following expression. The Y component represents brightness, the U component represents bluishness, and the V component represents reddishness.

$$\begin{pmatrix} Y \\ U \\ V \end{pmatrix} = \begin{pmatrix} 0.30 & 0.59 & 0.11 \\ -0.15 & -0.29 & 0.44 \\ 0.61 & -0.52 & 0.10 \end{pmatrix} \begin{pmatrix} R \\ G \\ B \end{pmatrix} \quad \text{Expression 24}$$

The color-fringing reducing unit 450 reduces this artifact in the color image through image processing. The color-fringing reducing unit 450 includes, as described later, an estimator 451, a corrector 452, and a reducer 453, and corrects the UV components utilizing the Y component as a reference component. The vision correction unit 460, the compression unit 470, and the recording unit 480 are similar to the vision correction unit 160, the compression unit 170, and the recording unit 180 of the first embodiment.

Figures 12, 13:
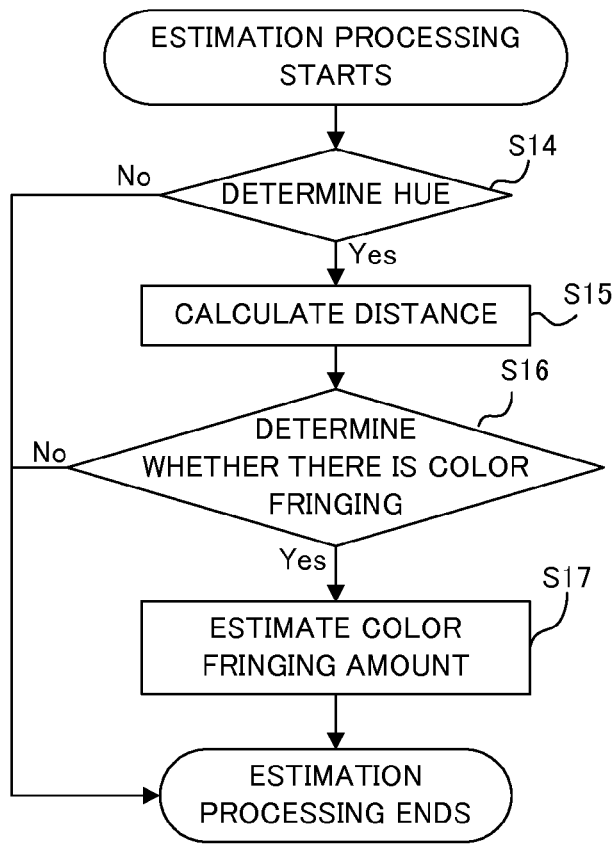
FIG. 12 is a flowchart for explaining an operation of an estimator illustrated in FIG. 11 according to the fourth embodiment.
FIG. 13 is a view illustrating a distance from a saturated pixel to each surrounding pixel according to the fourth embodiment.

FIG. 12 is a flowchart for explaining an operation of the estimator 451, and "S" stands for the step.

Initially, the estimator 451 performs processing similar to the hue determination (S11) in the first embodiment (S14), and calculates a distance from the saturated pixel (S15).

A description will now be given of the reason why the distance is calculated. The color fringing occurs around the highly bright object as illustrated in the typical profiles in FIG. 2A. This fringing intensity depends upon the brightness of the highly bright object, and becomes exponentially weaker when a distance from the highly bright object increases. In other words, the color fringing amount can be estimated by searching the highly bright object and by measuring a distance from it.

The highly bright object can be searched based upon whether the Y component representing the brightness is saturated, and the fringing amounts of the UV components can be estimated according to the distance from the searched saturated pixel. Hence, in S15, a distance dy is calculated with a pixel width unit from the saturated pixel in which the intensity of the Y component has a threshold or higher (Y≥0.8) to the color fringing pixel.

For example, when the upper left region (diagonal-line region) is a saturated pixel as illustrated in FIG. 13, the distances are expressed by a numerical value of each pixel. Herein, assume that each saturated pixel has a distance of 0.

Assume that the threshold of the intensity of the Y component is an output value outside the linear relationship between an output value of the AD converter and the incident light intensity. A state having a higher output value will be defined as "saturation." In general, the calculation of the distance is called an image distance conversion. This distance is not limited to an accurate Euclidean distance, and may be substituted by a quansi-Euclidean distance, a chessboard distance, or a city block distance. The saturated pixel has 0 and the non-saturated pixel has a positive value due to this image distance conversion.

Next, the estimator 451 determines whether the distance of the pixel from the saturated pixel is smaller than the threshold (S16). The threshold is determined by the spread of the color fringing, and depends upon the imaging optical system, the pixel pitch of the image sensor, or the brightness of the object. Therefore, it may be determined according to the characteristics of the imaging optical system and the image sensor, or may be set to a large value so as to handle a variety of imaging optical systems and imaging sensors. The surrounding distance threshold may be made variable according to the area of the adjacent saturated pixels.

Next, the estimator 451 estimates extra intensities of the UV components that cause color fringing to the pixel that is considered to have color fringing in S16 (S17). As described above, the image intensities to be reduced of the UV components can be calculated based upon a distance from the saturated pixel of the Y component. Thus, the color-fringing estimated amounts $E_U$ and $E_V$ are calculated as follows, and supplied to the corrector 452:

$$\begin{cases} E_U = k_{U0}\exp(-k_{U1}d_y) \\ E_V = k_{V0}\exp(-k_{V1}d_y) \end{cases} \quad \text{Expression 25}$$

Since $K_{U0}$, $K_{V0}$, $K_{U1}$, and $K_{V1}$ are constants and different according to a pixel pitch of the image sensor and the imaging optical system, it is suitable to calculate a proper value to approximate the color fringing amount based upon the captured image. Strictly speaking, since the characteristic of the imaging optical system depends upon a zoom position, a diaphragm value, a focus position, a lens exchanging state, and an image height, the constants $K_{U0}$, $K_{V0}$, $K_{U1}$, and $K_{V1}$ may be set according to these factors. Alternatively, a constant used to estimate an excessive color fringing amount may be set so as to handle the characteristic change of the imaging optical system by considering the corrector 452, which will be described later. It is more proper to set the constant used to estimate the excessive color fringing amount than the value suitable to approximate the color fringing amount.

Next, the corrector 452 makes a correction by considering the relationship between the color-fringing estimated amounts $E_U$ and $E_V$ calculated by the estimator 451, and calculates the color-fringing estimated amounts $E_U'$ and $E_V'$ to be actually removed from the UV components. The corrector 452 utilizes the UV chromaticity diagram.

Figure 14A:
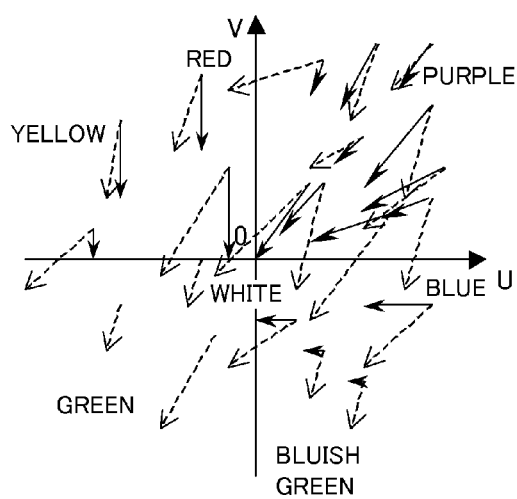
FIGS. 14A and 14B are ab chromaticity diagrams according to the fourth embodiment.

FIG. 14A illustrates one example of the UV chromaticity diagram. Blue is assigned to a region of U>0 and red is assigned to a region of V>0. When the color-fringing estimated amounts $E_U$ and $E_V$ are removed from the UV components, points move from the left direction to the lower direction as illustrated by dotted arrows. This direction changes depending upon the ratio between the color-fringing estimated amounts $E_U$ and $E_V$. A starting point of each arrow is the pre-removal chromaticity, and the tip is the chromaticity after the color-fringing estimated amounts $E_U$ and $E_V$ are removed. Herein, since the pixel in the region of U≤0 is less bluish, $E_U'$ is set to 0 and the reddishness is removed by utilizing $E_V$.

At this time, the following expression is set so as to prevent the V component from becoming a negative value due to $E_V$:

$$E_V' = \min(E_V, V) \quad \text{Expression 26}$$

Similarly, since pixels in the region of V≤0 are less reddish, $E_V'$ is set to 0 and $E_U'$ is set as follows so as to remove only bluishness:

$$E_U' = \min(E_U, U) \quad \text{Expression 27}$$

For pixels of U>0 and V>0, a hue angle h is calculated, and a ratio between the color-fringing estimated amounts $E_U$ and $E_V$ is varied by the hue angle so as to move the post-removal value to the origin. For example, if the hue angle h is 45° when U=0 is set to a reference, the ratio between the color-fringing estimated amounts $E_U$ and $E_V$ is limited to 1:1. Similarly, when it is 30°, $E_U$: $E_v$ is set to $\sqrt{3}$:1. The corrected color-fringing estimated amounts $E_U'$ and $E_v'$ become as follows in case of 0°<h<45°:

$$\begin{cases} E_U' = E_U \\ E_V' = E_U \times \tan(h) \end{cases} \quad \text{Expression 28}$$

In case of 45°<h<90°, the following expression is established:

$$\begin{cases} E_V' = E_V \\ E_U' = E_V \times \tan(90° - h) \end{cases} \quad \text{Expression 29}$$

The bluishness and reddishness can be thus mitigated without changing the hue. However, when the color-fringing estimated amount is large, the post-removal value moves from the first quadrant to the third quadrant, causing the hue inversion:

Accordingly, $E_U'$ and $E_V'$ need to be corrected so that U≥0 and V≥0 are satisfied. Use of the hue angle and hue limiting angle similar to those of the first and second embodiments are effective in this restricting method.

Figure 14B:
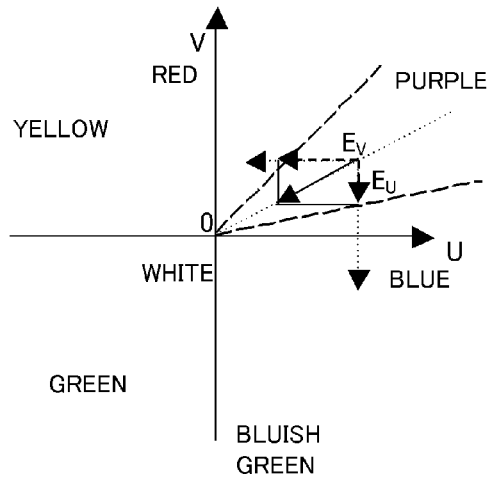

More specifically, as illustrated in FIG. 14B, when the hue angle h is set between 0° and 45°, the color-fringing estimated amounts $E_U'$ and $E_V'$ are calculated by calculating the equation by setting $E_U$ to the distance from the intersection with one of the h−Δh line and the V=0 line, which one is closer to the pre-removal coordinate.

Similarly, when the hue angle h is set between 45° and 90°, the color-fringing estimated amounts $E_U'$ and $E_V'$ are calculated by calculating the equation by setting $E_V$ to the distance from the intersection with one of the h+Δh line and the U=0 line, which one is closer to the pre-removal coordinate.

Thereby, even when the post-removal value of the pixel is located at the first quadrant, the color-fringing estimated amounts $E_U'$ and $E_V'$ that satisfy U≥0 and V≥0 after the removal can be calculated.

Chromaticity changes as a result of the removals of $E_U'$ and $E_V'$ fall within each quadrant as illustrated by solid arrows in FIG. 14A. Only V changes in the second quadrant, only U changes in the fourth quadrant, and nothing changes in the third quadrant. This means that the RB intensities do not decrease beyond the brightness Y and RB that are originally located under Y never change.

The thus corrected color-fringing estimated amounts $E_U'$ and $E_V'$ are supplied as final color-fringing estimated amounts to the reducer 453. The reducer 453 subtracts the color-fringing estimated amounts $E_U'$ and $E_V'$ corrected by the corrector 452 from the UV components and sets new intensities of the UV components:

$$\begin{cases} U = U - E_U' \\ V = V - E_V' \end{cases} \quad \text{Expression 30}$$

A color image in which the UV components are thus corrected is supplied as an output of the color-fringing reducing unit to the vision correction unit 460.

Since fringing of the B component and fringing of the R component are contained in the Y component in this embodiment, an amount of fringing that remains white is slightly larger than that when the G component is set to the reference component, but the cost of the processor can be restrained by performing major calculations for the UV components that do not require a high precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185066, filed Aug. 26, 2011, which is hereby incorporated by reference herein in its entirety.

What is claimed is:

1. An image processing apparatus configured to perform processing for reducing color fringing in a color image that contains a plurality of color components, said image processing apparatus comprising:
an estimator configured to estimate a color fringing amount caused by two color components in the plurality of color components;
a reducer configured to reduce the color fringing in the color image by a correction amount that is based upon the color fringing amount that has been estimated by the estimator; and
a correction amount obtainer configured to obtain the correction amount based upon the color fringing amount estimated by the estimator so that a color infringing region in the color image after the color fringing is reduced by the reducer is positioned in a restricted area in a chromaticity diagram,
wherein where a first line passes a first point in the chromaticity diagram corresponding to a target pixel of the color image before the color fringing is reduced and an origin representing an achromatic color in the chromaticity diagram, the restricted area in the chromaticity diagram is located on a side of the origin with respect to a second line that is perpendicular to the first line and passes the first point, and held between two third lines that are parallel to and hold the first line, and are separated from the first line by an equal distance that is equal to or smaller than half a distance between the origin and the first point, the restricted area being held by two lines each of which passes the origin and represents a boundary between a corresponding one of the two color components and an area representing a color component made by mixing the corresponding one of the two color components and another color component with each other.

2. The image processing apparatus according to claim 1, wherein the restricted area is held by two or more of lines each of which represents a chromaticity change when each of the two color components is independently removed from the first point.

3. The image processing apparatus according to claim 1, wherein the corrector corrects a color-fringing estimated amount of each color component estimated by the estimator so that chromaticity that is made by combining the color-fringing estimated amount of each color component can be located in the restricted area.

4. The image processing apparatus according to claim 1, wherein the corrector makes such a correction that a direction from the first point to a second point passes the origin where the second point corresponds to the target pixel in the color image in the chromaticity diagram after the color fringing is reduced.

5. The image processing apparatus according to claim 1, wherein the estimator estimates a correction amount of the color fringing by utilizing a slope of a signal intensity between adjacent pixels for each color component.

6. An image processing apparatus configured to perform processing for reducing color fringing in a color image that contains a plurality of color components, said image processing apparatus comprising:
an estimator configured to estimate a color fringing amount caused by two color components in the plurality of color components;
a reducer configured to reduce the color fringing in the color image by a correction amount that is based upon the color fringing amount that has been estimated by the estimator; and
a correction amount obtainer configured to obtain the correction amount based upon the color fringing amount estimated by the estimator so that a color infringing region in the color image after the color fringing is reduced by the reducer is positioned in a restricted area in a chromaticity diagram,
wherein where a first line passes a first point in the chromaticity diagram corresponding to a target pixel of the color image before the color fringing is reduced and an origin representing an achromatic color in the chromaticity diagram, the restricted area in the chromaticity diagram is located on a side of the origin with respect to a second line that is perpendicular to the first line and passes the first point, and held between two fourth lines each of which forms an angular difference of 45° or smaller from the first line around the origin.

7. The image processing apparatus according to claim 6, wherein the angular difference is set between 20° and 30°.

8. The image processing apparatus according to claim 6, wherein the corrector makes a correction by multiplying a color-fringing estimated amount of each color component estimated by the estimator, by a ratio of $d_1/d_0$, when $d_0$ that is a distance from the first point to a second point in the chromaticity diagram corresponding to the target pixel in the color image after the color fringing is reduced, is larger than $d_1$ that is a distance from the first point to an intersection between one of the two fourth lines located between the origin and the second line and a line made by connecting the first point and the second point.

9. An image processing method configured to perform processing for reducing color fringing in a color image that contains a plurality of color components, said image processing method comprising the steps of:
estimating a color fringing amount caused by two color components in the plurality of color components;
reducing the color fringing in the color image by a correction amount that is based upon the color fringing amount that has been estimated by the estimator; and
obtaining the correction amount based upon the color fringing amount estimated by the estimator so that a color infringing region in the color image after the color fringing is reduced by the reducing step is positioned in a restricted area in a chromaticity diagram,
wherein where a first line passes a first point in the chromaticity diagram corresponding to a target pixel of the color image before the color fringing is reduced and an origin representing an achromatic color in the chromaticity diagram, the restricted area in the chromaticity diagram is located on a side of the origin with respect to a second line that is perpendicular to the first line and passes the first point, and held between two third lines that are parallel to and hold the first line, and are separated from the first line by an equal distance that is equal to or smaller than half a distance between the origin and the first point, the restricted area being held by two lines each of which passes the origin and represents a boundary between a corresponding one of the two color components and an area representing a color component made by mixing the corresponding one of the two color components and another color component with each other.

10. An image processing method configured to perform processing for reducing color fringing in a color image that contains a plurality of color components, said image processing method comprising the steps of:
   estimating a color fringing amount caused by two color components in the plurality of color components;
   reducing the color fringing in the color image by a correction amount that is based upon the color fringing amount that has been estimated by the estimator; and
   obtaining the correction amount based upon the color fringing amount estimated by the estimator so that a color infringing region in the color image after the color fringing is reduced by the reducing step is positioned in a restricted area in a chromaticity diagram,
   wherein where a first line passes a first point in the chromaticity diagram corresponding to a target pixel of the color image before the color fringing is reduced and an origin representing an achromatic color in the chromaticity diagram, the restricted area in the chromaticity diagram is located on a side of the origin with respect to a second line that is perpendicular to the first line and passes the first point, and held between two fourth lines each of which forms an angular difference of 45° or smaller from the first line around the origin.

11. A non-transitory computer readable storage medium having recorded a computer program executed by a computer and used to perform processing for reducing color fringing in a color image that contains a plurality of color components, said program enabling the computer to serve as:
   an estimator configured to estimate a color fringing amount caused by two color components in the plurality of color components;
   a reducer configured to reduce the color fringing in the color image by a correction amount that is based upon the color fringing amount that has been estimated by the estimator; and
   a correction amount obtainer configured to obtain the correction amount based upon the color fringing amount estimated by the estimator so that a color infringing region in the color image after the color fringing is reduced by the reducer is positioned in a restricted area in a chromaticity diagram,
   wherein where a first line passes a first point in the chromaticity diagram corresponding to a target pixel of the color image before the color fringing is reduced and an origin representing an achromatic color in the chromaticity diagram, the restricted area in the chromaticity diagram is located on a side of the origin with respect to a second line that is perpendicular to the first line and passes the first point, and held between two third lines that are parallel to and hold the first line, and are separated from the first line by an equal distance that is equal to or smaller than half a distance between the origin and the first point, the restricted area being held by two lines each of which passes the origin and represents a boundary between a corresponding one of the two color components and an area representing a color component made by mixing the corresponding one of the two color components and another color component with each other.

12. A non-transitory computer readable storage medium having recorded a computer program executed by a computer and used to perform processing for reducing color fringing in a color image that contains a plurality of color components, said program enabling the computer to serve as:
   an estimator configured to estimate a color fringing amount caused by two color components in the plurality of color components;
   a reducer configured to reduce the color fringing in the color image by a correction amount that is based upon the color fringing amount that has been estimated by the estimator; and
   a correction amount obtainer configured to obtain the correction amount based upon the color fringing amount estimated by the estimator so that a color infringing region in the color image after the color fringing is reduced by the reducer is positioned in a restricted area in a chromaticity diagram,
   wherein where a first line passes a first point in the chromaticity diagram corresponding to a target pixel of the color image before the color fringing is reduced and an origin representing an achromatic color in the chromaticity diagram, the restricted area in the chromaticity diagram is located on a side of the origin with respect to a second line that is perpendicular to the first line and passes the first point, and held between two fourth lines each of which forms an angular difference of 45° or smaller from the first line around the origin.

13. An image pickup apparatus comprising an image processing apparatus according to claim 1.

* * * * *